(12) United States Patent
Nagendran et al.

(10) Patent No.: US 9,665,443 B1
(45) Date of Patent: May 30, 2017

(54) FILTERED INCREMENTAL BACKUPS

(71) Applicant: Pivotal Software, Inc., Palo Alto, CA (US)

(72) Inventors: Swetha Devarayasamudram Nagendran, Sunnyvale, CA (US); Ivan D. Novick, Sunnyvale, CA (US); James Bryan McAtamney, San Mateo, CA (US); Abhijit B. Subramanya, San Mateo, CA (US); Richa Sharma, Sunnyvale, CA (US)

(73) Assignee: Pivotal Software, Inc., San Francisco, CA (US)

( * ) Notice: Subject to any disclaimer, the term of this patent is extended or adjusted under 35 U.S.C. 154(b) by 232 days.

(21) Appl. No.: 14/150,235

(22) Filed: Jan. 8, 2014

(51) Int. Cl.
   *G06F 7/00* (2006.01)
   *G06F 17/00* (2006.01)
   *G06F 11/14* (2006.01)

(52) U.S. Cl.
   CPC .................. *G06F 11/1458* (2013.01)

(58) Field of Classification Search
   CPC ............ G06F 11/1464; G06F 11/1458; G06F 11/2097; G06F 17/30076; G06F 17/3015
   USPC ................. 707/645, 646, E17.007, 652, 654
   See application file for complete search history.

(56) References Cited

U.S. PATENT DOCUMENTS

| | | | | |
|---|---|---|---|---|
| 5,881,311 A | * | 3/1999 | Woods | G06F 3/0607 710/3 |
| 8,732,479 B1 | * | 5/2014 | Henriksen | G06F 11/1464 709/201 |
| 2004/0073582 A1 | * | 4/2004 | Spiegel | G06F 3/0619 |
| 2009/0144341 A1 | * | 6/2009 | Hauck | G06F 11/1464 |
| 2011/0196840 A1 | * | 8/2011 | Barzilai | G06F 11/1458 707/645 |
| 2011/0238626 A1 | * | 9/2011 | Hao | G06F 11/1458 707/644 |

* cited by examiner

Primary Examiner — MD. I Uddin

(57) ABSTRACT

Methods, systems, and apparatus, including computer programs encoded on computer storage media, for providing filtered backups of a distributed database. One of the methods includes receiving a user request to generate an incremental backup to be added to a user specified backup sequence for a distributed database, wherein the user specified backup sequence specifies a subset of one or more database tables to be included in backups in the user specified backup sequence. Dirty partitions of the one or more tables covered by the user specified backup sequence are identified, wherein a dirty partition is a table partition that was created or modified after generation of a most recent backup in the user specified backup sequence. An incremental backup to be added to the user specified backup sequence is generated, the incremental backup comprising contents of the dirty partitions of the tables covered by the user specified backup sequence.

24 Claims, 5 Drawing Sheets

| Time Stamp: | User Input: | Dirty Tables/ Partitions: | Backup Set "Prefix" | Default Backup Set |
|---|---|---|---|---|
| ts1 *210* | "Prefix," FULL *212* | T2, T3 *214* | T2  T3<br>ts1<br>*216* | |
| ts2 *220* | FULL *222* | T1, T2, T3, T4 *224* | | T1  T2<br>T3  T4<br>ts2<br>*226* |
| ts3 *230* | "Prefix," Incremental *232* | T2-Pi *234* | T2-Pi<br>ts3<br>*236* | |
| ts4 *240* | Incremental *242* | T1-Pj *244* | | T2-Pi<br>ts4<br>*246* |
| ts5 *250* | "Prefix," Incremental *252* | T3-Pk *254* | T3-Pk<br>ts5<br>*256* | |
| ts6 *260* | Restore *262* | | T2  T3<br>ts3 ts5<br>*266* | T2<br>ts4<br>T1  T3  T4<br>ts2<br>*268* |

FIG. 2

FILTERED INCREMENTAL BACKUPS

BACKGROUND

This specification relates distributed databases.

Massive distributed databases include tables that are partitioned across multiple storage devices, in which each partition stores a subset of rows or columns of a particular table. The tables of a distributed database can be backed up from time to time, which generally involves storing a complete copy of the contents of the database as it exists at a particular point in time.

A system can also generate incremental backups of a distributed database by storing only copies of individual portions of the database that have been added or changed since a full backup of the database.

SUMMARY

This specification describes how a system can generate filtered incremental backups for a distributed database. In general, the system receives a filter from a user that specifies a subset of tables of the database to include in a backup sequence. The backup sequence is an independent sequence of backups for a particular user-specified subset of tables of the database.

In general, one innovative aspect of the subject matter described in this specification can be embodied in methods that include the actions of receiving a user request to generate an incremental backup to be added to a user specified backup sequence for a distributed database, wherein the user specified backup sequence specifies a subset of one or more database tables to be included in backups in the user specified backup sequence, wherein the user specified backup sequence comprises an independent sequence of backups of the one or more tables covered by the user specified backup sequence, and wherein the distributed database includes one or more tables that are distributed as multiple partitions among one or more nodes; identifying dirty partitions of the one or more tables covered by the user specified backup sequence, wherein a dirty partition is a table partition that was created or modified after generation of a most recent backup in the user specified backup sequence; and generating an incremental backup to be added to the user specified backup sequence, the incremental backup comprising contents of the dirty partitions of the tables covered by the user specified backup sequence. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The user specified backup sequence specifies fewer tables than a set of tables included in the default backup sequence. The actions include receiving a user request to generate an incremental backup to be added to the default backup sequence; identifying as dirty partitions of tables covered by the default backup sequence those partitions that have been modified after generation of a most recent backup of tables covered by the default backup sequence; and generating an incremental backup in the default backup sequence comprising contents of the dirty partitions of the tables covered by the default backup sequence. The actions include receiving a user request to generate a full backup to be added to the user specified backup sequence; and generating a full backup in the user specified backup sequence, the full backup comprising contents of the one or more tables covered by the user specified backup sequence. The actions include receiving a user request to generate a full backup to be added to the default backup sequence; and generating a full backup in the default backup sequence, the full backup comprising contents of the tables covered by the default backup sequence. Identifying dirty partitions of the one or more tables covered by the user specified backup sequence comprises identifying a particular partition that is clean for the default backup sequence as dirty for the user specified backup sequence. The actions include generating a full backup of tables in the user specified backup sequence independently from a full backup of tables in the default backup sequence. The actions include receiving a request to restore the database from the user specified backup sequence; restoring database contents of the one or more tables covered by the user specified backup sequence from a most recent incremental backup in the user specified backup sequence; and restoring database contents of one or more tables covered by the user specified backup sequence from a most recent full backup in the user specified backup sequence.

Particular embodiments of the subject matter described in this specification can be implemented so as to realize one or more of the following advantages. Providing the ability to back up only a subset of tables of the database can be used to more easily transfer data from one database to another. System administrators can save storage space by generating backups for only the most valuable tables in the database, particular when other tables of the database can be regenerated from the backed up tables. A system can save network bandwidth by generating backups for only a portion of the database, for example, when backing up data to a remote location.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates multiple independent backup sequences.

Like reference numbers and designations in the various drawings indicate like elements.

DETAILED DESCRIPTION

Figure 1:
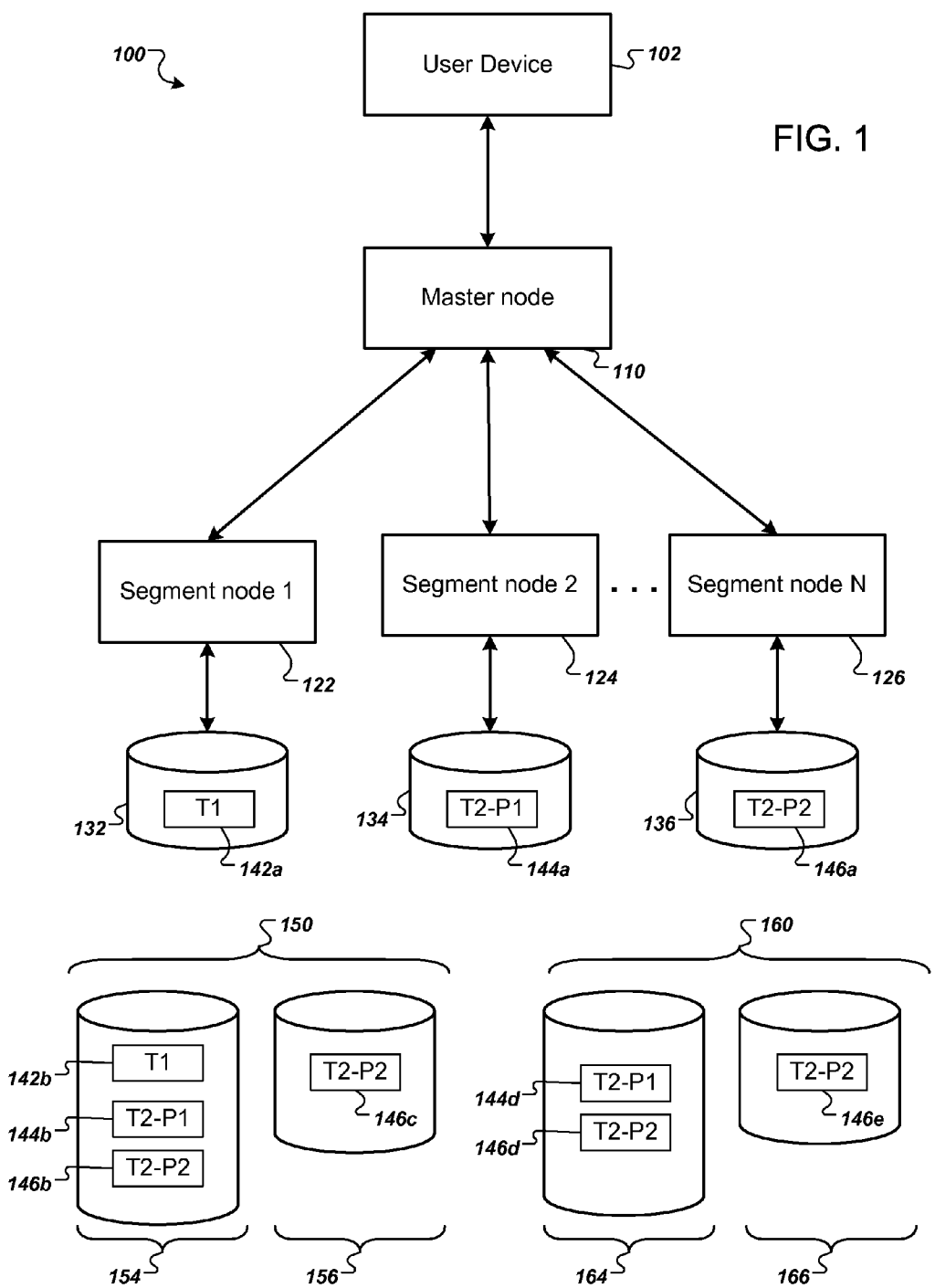
FIG. 1 is a diagram of an example distributed system.

FIG. 1 is a diagram of an example distributed system 100. The distributed system 100 is an example of a computing system in which filtered incremental backups can be generated.

The distributed system 100 includes a master node 110 and multiple segment nodes 122, 124, and 126. The master node 110 and each segment node 122, 124, and 126 are implemented as one or more physical computers or as software installed as a virtual machine on a physical computer. The master node 110 and the segment nodes 122, 124, and 126 are connected by one or more communications networks, e.g., a local area network or the Internet. The master node 110 assigns each segment node to manage a portion of data stored in the distributed system 100. Portions of data in the system can be table partitions 142a, 144a, and 146a of a relational database distributed among multiple storage devices 132, 134, and 136, e.g., as part of a massively parallel processing (MPP) database. For example, a first table of the database is stored in its entirety in a single partition 142a, while a second table of the database is distributed in two partitions 144a and 146a on different storage devices 134 and 136.

A distributed database generally includes one or more tables, which may also be referred to as relations. A partition is generally a subset of a database table, and can be stored either as a subset of rows of the table, or a subset of columns of the table. Each partition can be stored on a different storage device, although multiple partitions may be stored on a same storage device.

A user of user device 102 can access data stored in the distributed system by communicating with the master node 110. The user device 110 can be a personal computer, smartphone, or any other kind of computer-based device with which a user can interact. For example, a user can provide a query, e.g., a structured query language (SQL) or object query language (OQL) query, to the master node 110. The master node 110 can communicate with the segment hosts 122, 124, and 126 to obtain data that satisfies the query, which the master node 110 can communicate to the user device 102.

A user of user device 102 can also communicate with the master node to perform administration operations on the distributed database. For example, the user can request that the master node 110 generate a backup of the database. The master node 110 can then instruct each segment node 122, 124, and 126 to generate backups of their respective managed table partitions, e.g., by storing a copy of their respective partitions in one or more storage devices. In this specification, the master node will be described as generating backups, through the copy and storage operations required to generate a backup may actually be performed by the segment nodes managing the table partitions.

In general, generating a backup includes storing a copy of the contents of a portion of the database, e.g., storing the contents of the whole database, a single database table, or a single table partition. Generally, a backup is generated by storing the current contents of an appropriate portion of the database, in other words, using the contents of the database at the time that the backup is generated. Each backup can be associated with a timestamp that represents the time that the backup was generated.

A backup can be a full backup or an incremental backup. During a full backup, the master node 110 stores a copy of the contents of all partitions of all tables in the database. For example, the full backup 154 stores a copy of all partitions of all tables in the database, e.g., the partition 142b for table 1 and the partitions 144b and 146b for table 2.

During an incremental backup, the master node 110 stores a copy of the contents of only dirty partitions in the database. A dirty partition is a partition that has been created or updated since a last backup of the table to which the partition belongs, meaning a last incremental backup of the table if an incremental backup exists, or a last full backup of the table if no incremental backup of the table exists. For example, the incremental backup 156 stores a copy of only the dirty partition 146c. Thus, the partition 146c of the incremental backup 156 stores contents of the second partition of table 2 at a later time than the partition 146b of the full backup 154.

The master node 110 can create multiple independent backup sequences, e.g., the backup sequence 150 of the whole database and the backup sequence 160 of only table 2. Each backup sequence can include one or more full backups and one or more incremental backups. In general, a backup sequence refers to an independent sequence of backups covering a particular subset of tables of a database. A user can specify the subset of tables that will be covered by a particular backup sequence, the subset being referred to as a filter. For example, the backup sequence 160 is associated with a user-specified filter that includes only table 2 of the database. Thereafter, backups generated in the backup sequence will operate only on tables covered by the backup sequence as specified by the filter. Generally, a user cannot alter the subset of tables in the filter for a backup sequence once a backup in the backup sequence has been created. If the user does not specify a filter for a particular backup sequence, the master node 150 can instead generate a backup in a default backup sequence 150. The default backup sequence 150 may also be referred to as an unfiltered backup sequence. The default backup sequence 150 typically includes all tables of the database, although the default backup sequence 150 can be configured to include fewer than all tables of the database.

The user-specified filter typically includes fewer than all tables in the default backup sequence 150. However, the filter may include all tables of the default backup sequence 150. If the filter includes all tables of the default backup sequence 150, the master node 110 will generate a backup sequence that includes all tables of the default backup sequence 150 that is nevertheless independent from the default backup sequence 150.

System can generate a backup for tables specified by a filter by storing the contents of the table in a particular file in the system. The system can then generate incremental backups by updating the tables backed up by the file. Alternatively, each backup sequence can be identified by a prefix, which can be generated by the master node 110 upon receiving the user-specified filter for a backup sequence. The user can then request a backup, either full or incremental, of the backup sequence by specifying the generated prefix that identifies the backup sequence. By identifying each backup sequence with a filter, a user can generate multiple independent backup sequences.

When a user requests a backup to be generated in the backup sequence, the master node 110 will generate a backup in an independent sequence of backups in the backup sequence. For example, the user can request a full backup to be added to the backup sequence 160, and the master node 110 can generate the full backup 164 that includes only tables in the filter associated with the backup sequence 160. For example, because the filter for the backup sequence 160 includes only table 2, the full backup 164 for the backup sequence 160 includes only the partitions 144d and 146d of table 2 and does not include a copy of the partition 142a for table 1.

A user can also request generation of an incremental backup to be added to a backup sequence. For example, a user can specify a prefix of the backup sequence 160 when requesting an incremental backup. The master node 110 can then generate an incremental backup 166 of the backup sequence 160, which generates a backup only for dirty partitions of tables in the filter, e.g., the partition 146e.

Whether a partition is dirty or not depends on for which backup sequence a backup is being generated. For example, the partition 146a that stores current contents of table 2 of the database can be dirty for the backup sequence 160 but clean for the backup sequence 150. Thus, if the user requests a backup to be added to backup sequence 160, the master node 110 will store a copy 146e of the partition 146a. On the other hand, if the user requests a backup to be added to the backup sequence 150, the master node 110 will not store a copy of the partition 146a.

FIG. 2 illustrates multiple independent backup sequences. In general, FIG. 2 illustrates backups generated by a system for a database having four tables when receiving a series of backup requests for a user-specified backup sequence and a default, unfiltered backup sequence. In FIG. 2, the user-specified backup sequence has a filter that specifies "T2" and "T3," e.g., table 2 and table 3 of the database. The default backup sequence is unfiltered. Thus, it includes all four tables of the database, "T1," "T2," "T3," and "T4." The backup operations will be described as being performed by an appropriately programmed system of one or more computers, e.g., the system 100 in FIG. 1.

At timestamp 1 (210), the system receives user input 212 specifying a prefix that identifies the user-specified backup sequence and requesting a full backup. The system then generates a full backup 216 of tables 214 specified by the filter. In other words, the system generates a backup 216 by storing a copy of the contents of the tables specified by the filter as of timestamp 1.

At timestamp 2 (220), the system receives user input 222 requesting a full backup. Because the user input 222 did not specify a prefix, the system generates a full backup 226 in the default backup sequence. In other words, the system generates a full backup 226 of all four tables 224 of the database as part of the full backup 226 in the default backup sequence.

At timestamp 3 (230), the system receives user input 232 specifying a prefix of the user-specified backup sequence and requesting an incremental backup. The system determines dirty partitions 234 of tables specified by the filter of the user-specified backup sequence, e.g., partition i of "T2." The system then generates an incremental backup 236 by storing a copy of the contents of the dirty partition 234.

At timestamp 4 (240), the system receives user input 242 requesting generation of an incremental backup. Because the user input 242 did not specify a prefix, the system generates an incremental backup 246 to be added to the default backup sequence. The system determines dirty partitions 244 of all tables in the database, e.g, partition j of "T2." Because the user-specified backup sequence and the default backup sequence are independent, partition j of "T2" may be dirty for the default backup sequence even though contents of that partition may not have changed since the incremental backup 236 was generated.

At timestamp 5 (250), the system receives user input 252 specifying a prefix of the user-specified backup sequence and requesting generation of an incremental backup. The system determines dirty partitions 254 of tables specified by the filter of the user-specified backup sequence, e.g., partition k of "T3." The system then generates an incremental backup 256 by storing a copy of the contents of the dirty partition 254 in association with the user-specified backup sequence.

At timestamp 6 (260), the system receives a user input 262 requesting a restore. Data is restored to the database in reverse order from incremental backups until a full backup is reached. In general, a restore restores data in the database from a single backup sequence. Thus, what data gets restored to the database depends on whether the restore is invoked for the user-specified backup sequence or the default backup sequence. For the default backup sequence, the database will be restored using data 268 that includes the contents of "T2" at timestamp 4, and "T1," "T3," and "T4" at timestamp 2. For the user-specified backup sequence, the database will be restored using data 266 that includes the contents of "T2" at timestamp 3 and "T3" at timestamp 5.

Figure 3:
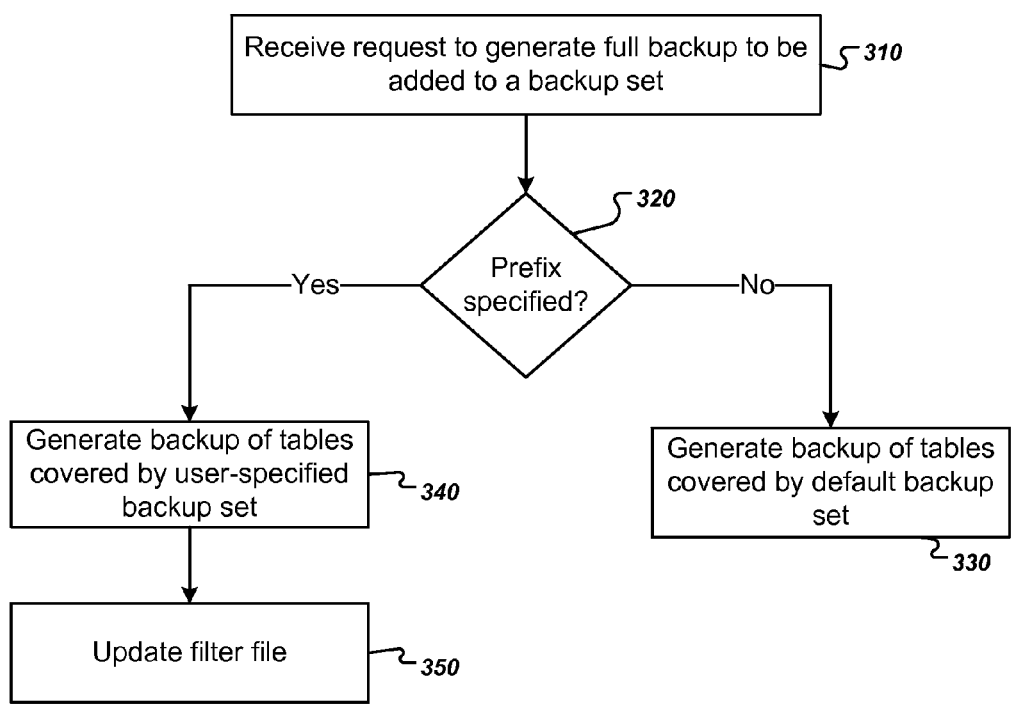
FIG. 3 is a flow chart of an example process for generating a full backup to be added to a backup sequence.

FIG. 3 is a flow chart of an example process for generating a full backup to be added to a backup sequence. In general, the system will generate a full backup of tables in a default backup sequence or tables in a user-specified backup sequence. The example process can be performed by a master node of a distributed database, e.g., the master node 110 of FIG. 1. The process will be described as being performed by an appropriately programmed system of one or more computers.

The system receives a request to generate a full backup to be added to a backup sequence (310). The request can be received from a user device in communication with a master node of the database.

The system determines whether the user specified a prefix that identifies a user-specified backup sequence (320). If not, the system the system generates a full backup of tables covered by the default backup sequence (branch to 330), e.g., a backup that stores the contents of all tables in the database.

If the user did specify a prefix, the system generates a full backup of tables covered by the user-specified backup sequence (branch to 340). The system then generates a filter file that includes a list of tables specified by the user to be included in the backup sequence. The system can use the filter file during incremental backups to filter dirty tables. The filter file has an associated timestamp that represents the time at which the full backup in the user-specified backup sequence was generated.

Figure 4:
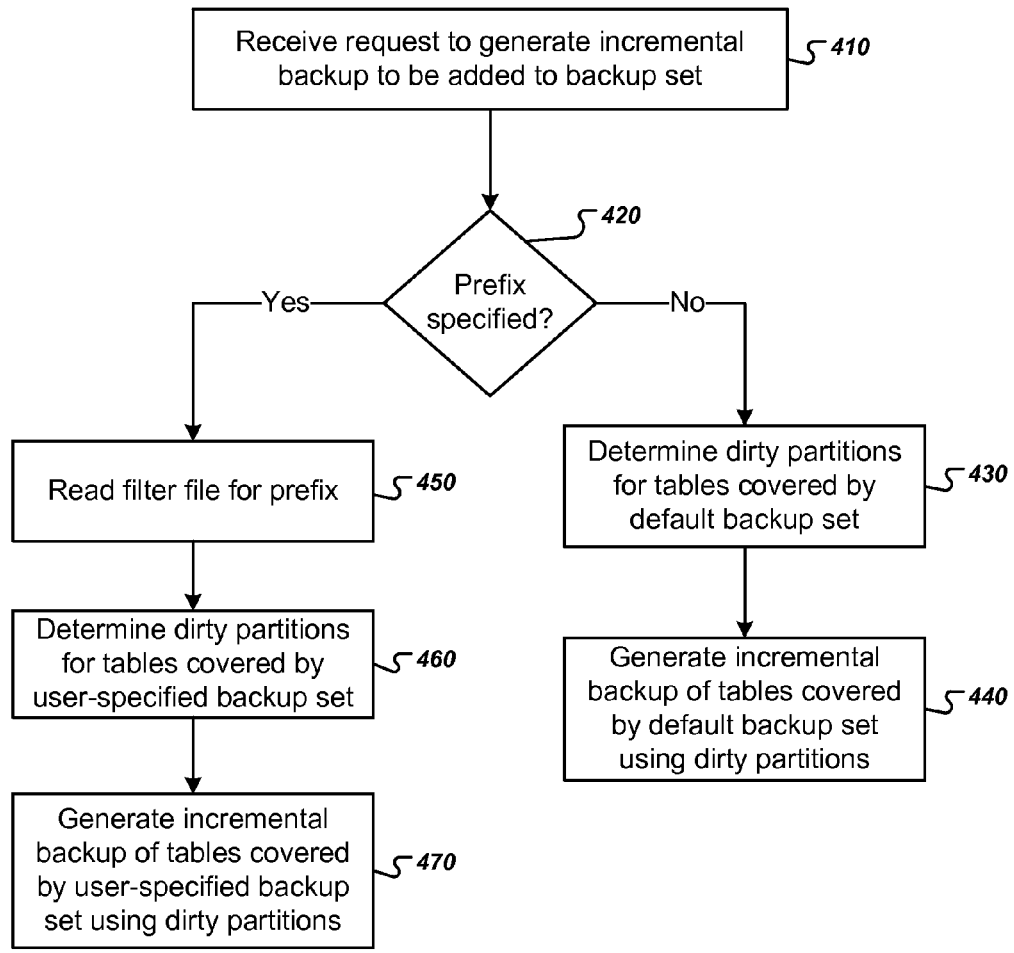
FIG. 4 is a flow chart of an example process for generating an incremental backup to be added to a backup sequence.

FIG. 4 is a flow chart of an example process for generating an incremental backup to be added to a backup sequence. In general, the system will generate an incremental backup of tables in a default backup sequence or tables in a filter file of a user-specified backup sequence. The example process can be performed by a master node of a distributed database, e.g., the master node 110 of FIG. 1. The process will be described as being performed by an appropriately programmed system of one or more computers.

The system receives a request to generate an incremental backup to be added to a backup sequence (410), from a user device in communication with a master node of the database.

The system then determines whether the user specified a prefix that identifies a user-specified backup sequence (420).

If not, the system determines dirty partitions for tables covered by the default backup sequence (branch to 430), e.g., for all dirty partitions in the database. The system then generates an incremental backup of tables covered by the default backup sequence (440), e.g., by storing a copy of all dirty partitions in the database.

If the user did specify a prefix, the system reads a filter file for the prefix (branch to 450). The filter file includes a list of tables covered by the user-specified backup sequence, as well as a timestamp of the last full backup in the user-specified backup sequence.

The system determines dirty partitions for tables covered by the user-specified backup sequence (460). For example, the system determines table partitions that were created or modified since generating the last full backup in the user-specified backup sequence.

The system generates an incremental backup of tables covered by the user-specified backup sequence using the dirty partitions (470), e.g., by storing a copy of the dirty partitions.

Figure 5:
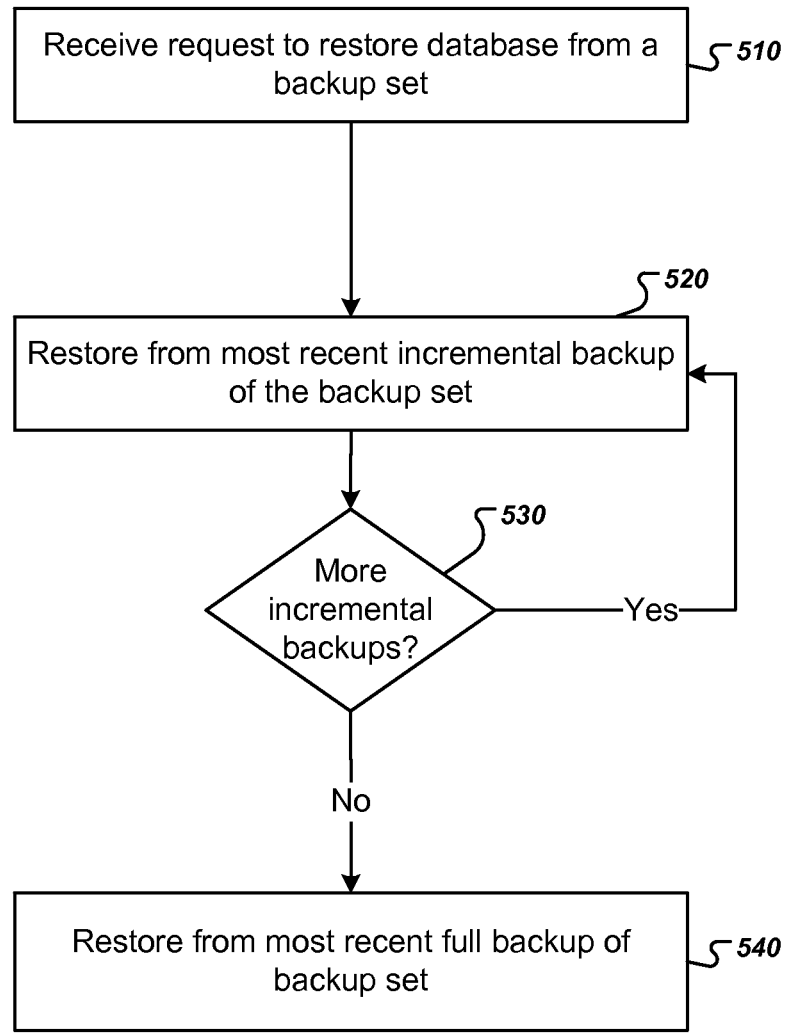
FIG. 5 is a flow chart of an example process for restoring contents of a database from a backup sequence.

FIG. 5 is a flow chart of an example process for restoring contents of a database from a backup sequence. In general, a system will restore database contents using incremental backups in reverse order by timestamp, until a full backup is found. The process in FIG. 5 can be performed equally for a user-specified or a default backup sequence. The example process can be performed by a master node of a distributed database, e.g., the master node 110 of FIG. 1. The process will be described as being performed by an appropriately programmed system of one or more computers.

The system receives a request to restore a database from a backup sequence (510), e.g., from a user device.

The system restores from a most-recent incremental backup in the backup sequence (520). The system locates the most-recent incremental backup in the backup sequence and copies the contents of the incremental backup to the database.

The system determines whether more incremental backups remain to be restored (530). In general, the system will restore from all incremental backups in a backup sequence until a full backup is found. If more incremental backups remain, the system will proceed to restore from a next-most-recent incremental backup (branch to 520).

Otherwise, the system will restore from a most-recent full backup in the backup sequence (branch to 540). In general, the system uses the most recently updated values for each item in the database and ignores older versions for items in incremental or full backups that have already been restored.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a user request to generate an incremental backup to be added to a backup sequence for a distributed database, the distributed database comprising one or more tables that are distributed as multiple partitions among one or more nodes, the partitions of the distributed database having respective contents and each partition storing a subset of rows or columns of a particular table of the one or more tables;
   determining that the user request includes an identification of a user-specified backup sequence as the backup sequence, which is distinct from a default backup sequence, the default backup sequence including backups of all tables of the distributed database when the user request does not include an identification of a user-specified backup sequence as the backup sequence,
   wherein the user-specified backup sequence:
      specifies a plurality of the one or more tables to be included in backups in the user-specified backup sequence independent of whether dirty partitions are included in the one or more tables, and
      comprises an independent sequence of backups of the plurality of the one or more tables specified to be included in backups in the user-specified backup sequence, and
   in response to determining that the user request includes an identification of a user-specified backup sequence:
      identifying dirty partitions of the plurality of the one or more tables specified to be included in backups in the user-specified backup sequence, wherein a dirty partition is a table partition that was created or modified after generation of a most-recent backup in the user-specified backup sequence; and
      generating an incremental backup to be added to the user-specified backup sequence, the incremental backup comprising the contents of the dirty partitions, and excluding non-dirty partitions, of the tables specified to be included in backups in the user-specified backup sequence.

2. The method of claim 1, wherein the user-specified backup sequence specifies fewer tables than a set of tables included in the default backup sequence.

3. The method of claim 2, further comprising:
   in response to determining that the user request does not include an identification of a user-specified backup sequence:
      identifying as dirty partitions of tables covered by the default backup sequence those partitions that have been modified after generation of a most-recent backup of tables covered by the default backup sequence; and
      generating an incremental backup in the default backup sequence, the incremental backup storing the contents of the dirty partitions of the tables covered by the default backup sequence.

4. The method of claim 2, further comprising:
   receiving a user request to generate a full backup to be added to the user-specified backup sequence; and
   generating a full backup in the user-specified backup sequence, the full backup being a complete backup of the one or more tables specified to be included in backups in the user-specified backup sequence.

5. The method of claim 2, further comprising:
   receiving a user request to generate a full backup to be added to the default backup sequence; and generating a full backup in the default backup sequence, the full backup being a complete backup of the tables covered by the default backup sequence.

6. The method of claim 2, wherein identifying dirty partitions of the one or more tables covered by the user-specified backup sequence comprises identifying partitions as clean or dirty for the user-specified backup sequence without regard to whether the partitions are clean or dirty for the default backup sequence.

7. The method of claim 1, further comprising, in response to receiving a user request to generate a full backup to be added to the user-specified backup sequence and receiving a user request to generate a full backup to be added to the default backup sequence, generating a full backup of tables in the user-specified backup sequence independently from generating a full backup of tables in the default backup sequence.

8. The method of claim 1, further comprising:
receiving a request to restore the database from the user-specified backup sequence;
restoring database contents of the one or more tables specified to be included in backups in the user-specified backup sequence from a most recent incremental backup in the user-specified backup sequence; and
restoring database contents of one or more tables specified to be included in backups in the user-specified backup sequence from a most recent full backup in the user-specified backup sequence.

9. A system comprising:
one or more computers and one or more storage devices storing instructions that are operable, when executed by the one or more computers, to cause the one or more computers to perform operations comprising:
receiving a user request to generate an incremental backup to be added to a backup sequence for a distributed database, the distributed database comprising one or more tables that are distributed as multiple partitions among one or more nodes, the partitions of the distributed database having respective contents and each partition storing a subset of rows or columns of a particular table of the one or more tables;
determining that the user request includes an identification of a user-specified backup sequence as the backup sequence, which is distinct from a default backup sequence, the default backup sequence including backups of all tables of the distributed database when the user request does not include an identification of a user-specified backup sequence as the backup sequence,
wherein the user-specified backup sequence:
specifies a plurality of the one or more tables to be included in backups in the user-specified backup sequence independent of whether dirty partitions are included in the one or more tables, and
comprises an independent sequence of backups of the plurality of the one or more tables specified to be included in backups in the user-specified backup sequence, and
in response to determining that the user request includes an identification of a user-specified backup sequence:
identifying dirty partitions of the plurality of the one or more tables specified to be included in backups in the user-specified backup sequence, wherein a dirty partition is a table partition that was created or modified after generation of a most-recent backup in the user-specified backup sequence; and
generating an incremental backup to be added to the user-specified backup sequence, the incremental backup comprising the contents of the dirty partitions, and excluding non-dirty partitions, of the tables specified to be included in backups in the user-specified backup sequence.

10. The system of claim 9, wherein the user-specified backup sequence specifies fewer tables than a set of tables included in the default backup sequence.

11. The system of claim 10, wherein the operations further comprise:
in response to determining that the user request does not include an identification of a user-specified backup sequence:
identifying as dirty partitions of tables covered by the default backup sequence those partitions that have been modified after generation of a most-recent backup of tables covered by the default backup sequence; and
generating an incremental backup in the default backup sequence, the incremental backup storing the contents of the dirty partitions of the tables covered by the default backup sequence.

12. The system of claim 10, wherein the operations further comprise:
receiving a user request to generate a full backup to be added to the user-specified backup sequence; and
generating a full backup in the user-specified backup sequence, the full backup being a complete backup of the one or more tables specified to be included in backups in the user-specified backup sequence.

13. The system of claim 10, wherein the operations further comprise:
receiving a user request to generate a full backup to be added to the default backup sequence; and
generating a full backup in the default backup sequence, the full backup being a complete backup of the tables covered by the default backup sequence.

14. The system of claim 10, wherein identifying dirty partitions of the one or more tables specified to be included in backups in the user-specified backup sequence comprises identifying partitions as clean or dirty for the user-specified backup sequence without regard to whether the partitions are clean or dirty for the default backup sequence.

15. The system of claim 9, wherein the operations further comprise, in response to receiving a user request to generate a full backup to be added to the user-specified backup sequence and receiving a user request to generate a full backup to be added to the default backup sequence, generating a full backup of tables in the user-specified backup sequence independently from generating a full backup of tables in the default backup sequence.

16. The system of claim 9, wherein the operations further comprise:
receiving a request to restore the database from the user-specified backup sequence;
restoring database contents of the one or more tables specified to be included in backups in the user-specified backup sequence from a most recent incremental backup in the user-specified backup sequence; and
restoring database contents of one or more tables specified to be included in backups in the user-specified backup sequence from a most recent full backup in the user-specified backup sequence.

17. A computer program product, encoded on one or more non-transitory computer storage media, comprising instructions that when executed by one or more computers cause the one or more computers to perform operations comprising:
- receiving a user request to generate an incremental backup to be added to a backup sequence for a distributed database, the distributed database comprising one or more tables that are distributed as multiple partitions among one or more nodes, the partitions of the distributed database having respective contents and each partition storing a subset of rows or columns of a particular table of the one or more tables;
- determining that the user request includes an identification of a user-specified backup sequence as the backup sequence, which is distinct from a default backup sequence, the default backup sequence including backups of all tables of the distributed database when the user request does not include an identification of a user-specified backup sequence as the backup sequence,
- wherein the user-specified backup sequence:
  - specifies a plurality of the one or more tables to be included in backups in the user-specified backup sequence independent of whether dirty partitions are included in the one or more tables, and
  - comprises an independent sequence of backups of the plurality of the one or more tables specified to be included in backups in the user-specified backup sequence, and
- in response to determining that the user request includes an identification of a user-specified backup sequence:
  - identifying dirty partitions of the plurality of the one or more tables specified to be included in backups in the user-specified backup sequence, wherein a dirty partition is a table partition that was created or modified after generation of a most-recent backup in the user-specified backup sequence; and
  - generating an incremental backup to be added to the user-specified backup sequence, the incremental backup comprising the contents of the dirty partitions, and excluding non-dirty partitions, of the tables specified to be included in backups in the user-specified backup sequence.

18. The computer program product of claim 17, wherein the user-specified backup sequence specifies fewer tables than a set of tables included in the default backup sequence.

19. The computer program product of claim 18, wherein the operations further comprise:
- in response to determining that the user request does not include an identification of a user-specified backup sequence:
  - identifying as dirty partitions of tables covered by the default backup sequence those partitions that have been modified after generation of a most-recent backup of tables covered by the default backup sequence; and
  - generating an incremental backup in the default backup sequence, the incremental backup storing the contents of the dirty partitions of the tables covered by the default backup sequence.

20. The computer program product of claim 18, wherein the operations further comprise:
- receiving a user request to generate a full backup to be added to the user-specified backup sequence; and
- generating a full backup in the user-specified backup sequence, the full backup being a complete backup of the one or more tables specified to be included in backups in the user-specified backup sequence.

21. The computer program product of claim 18, wherein the operations further comprise:
- receiving a user request to generate a full backup to be added to the default backup sequence; and
- generating a full backup in the default backup sequence, the full backup being a complete backup of the tables covered by the default backup sequence.

22. The computer program product of claim 18, wherein identifying dirty partitions of the one or more tables specified to be included in backups in the user-specified backup sequence comprises identifying partitions as clean or dirty for the user-specified backup sequence without regard to whether the partitions are clean or dirty for the default backup sequence.

23. The computer program product of claim 17, wherein the operations further comprise, in response to receiving a user request to generate a full backup to be added to the user-specified backup sequence and receiving a user request to generate a full backup to be added to the default backup sequence, generating a full backup of tables in the user-specified backup sequence independently from generating a full backup of tables in the default backup sequence.

24. The computer program product of claim 17, wherein the operations further comprise:
- receiving a request to restore the database from the user-specified backup sequence;
- restoring database contents of the one or more tables specified to be included in backups in the user-specified backup sequence from a most recent incremental backup in the user-specified backup sequence; and
- restoring database contents of one or more tables specified to be included in backups in the user-specified backup sequence from a most recent full backup in the user-specified backup sequence.

* * * * *